United States Patent [19]

Sweet

[11] Patent Number: 4,672,643
[45] Date of Patent: Jun. 9, 1987

[54] SERIAL PULSE FREQUENCY CONVERTER

[75] Inventor: Douglas W. Sweet, Flint, Mich.

[73] Assignee: General Motors Corporation, Detroit, Mich.

[21] Appl. No.: 858,710

[22] Filed: May 2, 1986

[51] Int. Cl.[4] .................. G01P 3/481; G06F 13/00
[52] U.S. Cl. .................................. 377/47; 377/49; 377/24; 364/561
[58] Field of Search .................. 377/24, 47, 49; 364/561; 324/166

[56] References Cited

U.S. PATENT DOCUMENTS

| | | | |
|---|---|---|---|
| 3,835,396 | 9/1974 | Demos et al. | 377/47 |
| 4,051,434 | 9/1977 | Sweet | 324/166 |
| 4,140,970 | 2/1979 | Graziano | 377/24 |
| 4,339,722 | 7/1982 | Sydor et al. | 377/47 |
| 4,413,350 | 11/1983 | Bond et al. | 377/47 |
| 4,434,470 | 2/1984 | Thomas et al. | 377/49 |
| 4,581,713 | 4/1986 | Fennel | 377/49 |

OTHER PUBLICATIONS

*Digital Design*—by R. K. Richards copyright 1971 by Wiley–Interscience, pp. 330-331 "Serial Techniques in Multiplication".

*Primary Examiner*—John S. Heyman
*Attorney, Agent, or Firm*—Robert M. Sigler

[57] ABSTRACT

A serial pulse frequency converter is disclosed of the type which counts high frequency clock pulses between input pulses, multiplies each successive count by first and second proportionally constants and downcounts the products by high frequency clock pulses to produce output pulses at a new, proportional frequency. A first serial register is used to both count the high frequency pulses between input pulses and hold the count during the multiplication process. It is loaded at the end of multiplication with the a number representing the "lost counts" as it is switched to its counting mode. A second serial register accumulates the sum of partial products of the count and the proportionality constants. The gain circuit serially provides a first proportionality constant and then a second, but may selectively substitute a binary number representing a constant unity for the second. A low frequency detect circuit disables the output if a one is detected in the most significant bit of the first serial register and does not reenable the circuit until two consecutive zeros are detected in the bit. This allows the use of certain economical circuitry in the partial product accumulation and downcounting circuitry which produces accurate results as long as the most significant bit of the registers is zero.

6 Claims, 5 Drawing Figures

SERIAL PULSE FREQUENCY CONVERTER

BACKGROUND OF THE INVENTION

This invention relates to a serial pulse frequency converter of the type adapted to convert a pulse train from a transducer in a vehicle driveline at a first frequency indicating vehicle speed to a pulse train at a proportional second frequency for use by a vehicle mounted electronic speedometer. Increased use of such electronic speedometers with a variety of transducers and driveline designs has produced the potential for a proliferation of specialized vehicle speedometer cluster assemblies, with each assembly being adapted for a different proportionality constant between vehicle speed and the corresponding pulse frequency output of the transducer in the particular driveline. A serial pulse frequency converter enables a single speedometer cluster to be used with a variety of transducers having different ratios of vehicle speed to output pulse frequency.

Most commercially available pulse frequency converters allow only conversion ratios which are countdowns of 256 or other powers of two. A practical device for the described application, however, requires finer control over the conversion ratio. One prior art device, an example of which is shown in U.S. Pat. No. 3,835,396, issued Sept. 10, 1974 to Demos et al, counts high frequency clock pulses between input pulses, multiplies and divides the count by constants defining a proportionality ratio and downcounts the transformed count by high frequency clock pulses to produce output pulses. This is the general approach to the problem used by the apparatus of this invention. However, the apparatus of this invention is an improvement on the prior art apparatus.

SUMMARY OF THE INVENTION

The serial pulse frequency converter of this invention comprises clock means generating clock pulses, each N consecutive clock pulses defining a word frame, first and second serial registers clocked by the clock pulses, first and second enabling gate means, a gain circuit triggerable to serially output first and second proportionality constants at the rate of one bit each word frame to enable or disable the first enabling gate means for the duration of the word frame, a first adder having an input connected to the output of the first serial register through the first enabling gate means and an output connected to the input of the second serial register, the first adder having another input connected through the second enabling gate means to the second least significant bit of the second serial register, zero circuit means effective to disable the first and second enabling gates for the last clock pulse of each word frame and to disable the second enabling gate for the first and N+1th word frame after the reception of an input pulse, constant generating means having a serial output and being effective to serially generate the number 2N during each word frame, a second adder receiving the first clock pulse of each word frame as the word pulse on one input thereof and having another input connected to the output of the first serial register, and multiplexer means. The multiplexer means is effective (a) to connect the input of the first serial register to the output thereof during word frames number 1 to N−1 and word frames number N+1 to 2N−1 following the reception of an input pulse for recirculation of the contents to allow serial first and second multiplications by successive bits of the first and second proportionality constants in the first enabling means and accumulation of the sums of partial products of the first and second multiplications in the second serial register, (b) during the Nth word frame after the reception of an input pulse to connect the output of the first adder to the input of the first serial register for replacement of the contents of the latter by the product of the first multiplication during the creation of the last partial product of the first multiplication, (c) during the 2Nth word frame after the reception of an input pulse to connect the output of the constant generating means to the input of the first serial register for replacement of the contents of the latter by the number of word frames used in the serial first and second multiplications during the creation of the last partial product of the second multiplication and (d) for each word frame after number 2N until the next input pulse to connect the input of the first serial register to the output of the second adder, whereby the count in the first serial register is incremented by one during each word frame and maintains an accurate total count of word frames between consecutive input pulses.

The serial pulse frequency converter of this invention has a number of advantages over the prior art. The first serial register serves a dual purpose, recirculating its contents for a predetermined number of word frames after each input pulse to repeatedly provide the prior count for multiplication by each successive bit of the first and second proportionality constants but counting word frames thereafter until the next input pulse after being initialized with the count of the word frames missed during the multiplication process for an accurate count until the next input pulse. A single N bit second serial register is used with certain enabling gate logic to accumulate the approximate sum of the partial products with discard of the least significant N bits of the true sum, since there is no real need for the accuracy that would be obtained by their inclusion in another accumulating serial register. In one embodiment, a low frequency disable circuit checks the most significant bit of the first serial register during each word frame by examining the input thereto, disables the output of the converter when a one is detected in the bit and reenables the output of the converter only when two consecutive zeros are detected in the bit following input pulses in order to allow unreliable information to be cleared from the system. This allows the use of certain economical circuit arrangements in the partial product accumulation and downcounting portions of the converter which operate accurately only if the most significant bit of the register used in the counting portion of the converter is zero. In another embodiment, registers are provided to hold and serially output the first and second proportionality constants and means are provided to selectively pass either the second or a number representing a proportionality constant of unity to the register outputting the first to replace the first in the second multiplication, whereby the second proportionality constant is optional.

Further details and advantages of this invention will be apparent from the accompanying drawings and following description of a preferred embodiment.

DESCRIPTION OF THE PREFERRED EMBODIMENT

Figure 1:
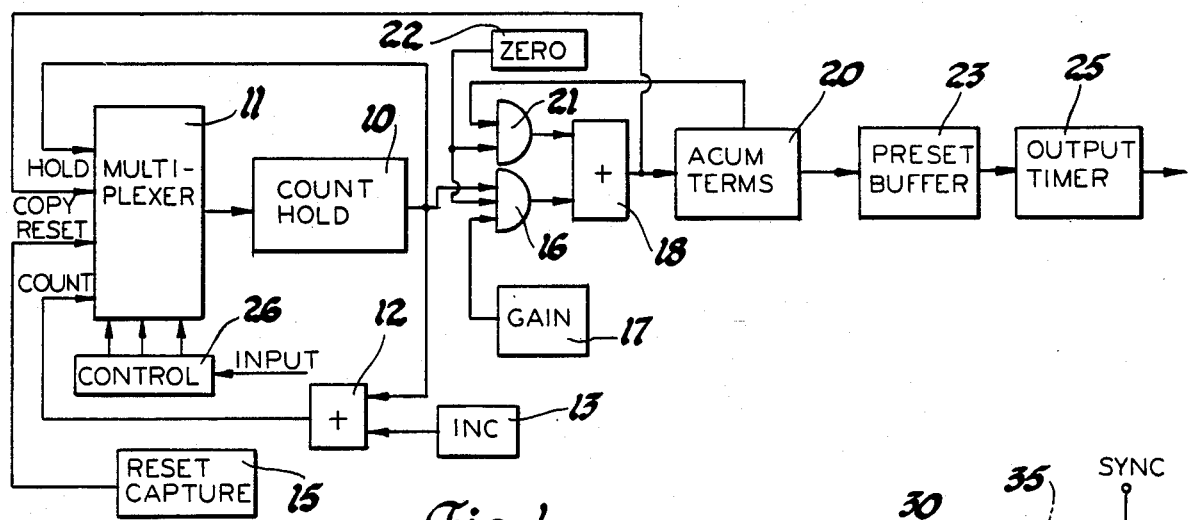
FIG. 1 shows a block diagram of a serial pulse frequency converter according to this invention.

Referring to FIG. 1, a first serial register 10, labeled COUNT HOLD, has an input to its most significant bit from a MULTIPLEXER 11. MULTIPLEXER 11 is connected to select the input bit stream from a plurality of lines, one of which, labeled HOLD, is the output of the least significant bit of COUNT HOLD register 10. The least significant bit output of COUNT HOLD register 10 is further provided to an adder 12, which has another input from an incrementing (INC) circuit 13 and an output which is another line, labeled COUNT, selectable by MULTIPLEXER 11. Yet another line selectable by MULTIPLEXER 11 and labeled RESET is the output of a RESET CAPTURE circuit 15, which generates a reference number. MULTIPLEXER 11 is controlled by a CONTROL circuit 26, which receives an INPUT pulse signal at a pulse frequency which is to be converted to a proportional output pulse frequency. A fourth input to MULTIPLEXER 11 is labeled COPY. The bit streams selectable by MULTIPLEXER 11 have a common clock frequency much greater than any possible input pulse frequency to be converted.

The output of COUNT HOLD register 10 is further provided to one input of an AND gate 16, the other input of which is connected to the output of a GAIN circuit 17, which generates the proportionality gain constants. The output of AND gate 16 is connected to one input of an adder 18, the output of which is provided to the most significant bit input of a serial register 20, labeled ACUM TERMS, and also to input COPY of MULTIPLEXER 11. ACUM TERMS register 20 has an output from its second least significant bit position which is provided to an input of an AND gate 21, which has another input from a ZERO circuit 22 and an output connected to the other input of adder 18. ZERO circuit 22 also has an output to an input of AND gate 16. ACUM TERMS register 20 further has a least significant bit output controllably provided to a PRESET BUFFER 23, which has an output controllably provided to an OUTPUT TIMER 25. The output of OUTPUT TIMER 25 is a pulse output having a pulse frequency proportional to that of the INPUT pulse signal provided to CONTROL 26.

In the circuit of FIG. 1, the serial registers contain sixteen bit positions; however, the system is designed so that the valid numbers contained therein cannot be more than 15 bits. The most significant bit is thus available for use as a test bit for overflow, underflow or other similar conditions at various places in the circuit. It also enables the use of certain advantageous circuit arrangements, to be pointed out as they are described, which might not operate correctly with full 16 bit binary numbers but do operate correctly within the described embodiment.

The circuit of the invention works with pulse frequencies at three different orders of magnitude. The frequency of the INPUT pulses, which frequency is to be proportionally changed, is the lowest frequency, typically 2-100 Hz. The circuit generates clock pulses CLK at the highest frequency, typically 1 MHz, which pulses clock the circulation of bit streams within the registers and adders except as described. Each 16 consecutive clock pulses CLK define a word frame, which are counted at a frequency of substantially 62.5 KHz (for 1 MHz CLK pulses), a frequency much higher than that of the INPUT pulses.

The basic operation of the system, as shown in FIG. 1, is to count the number of word frames between each two consecutive INPUT pulses in COUNT HOLD register 10, multiply the count by first and second proportionality constants using AND gate 16, adder 18 and ACUM TERMS register 20, store the resulting number in PRESET BUFFER 23 and repeatedly load the number from PRESET BUFFER 23 into OUTPUT TIMER 25, count down to zero and generate an output pulse. The output pulses thus occur with a frequency which is proportional to the input pulse frequency.

COUNT HOLD register 10 serves a dual purpose. In addition to counting the word frames between INPUT pulses, it is also used in the multiplication process to repeatedly provide one of the numbers to be multiplied to AND gate 16 as the sum of the partial products is accumulated in ACUM TERMS register 20. With each new INPUT pulse, multiplexer 11 is switched by control circuit 26 to recirculate the output of COUNT HOLD register 10 to its input so that the final count of the previous input period is retained for multiplication. When sufficient word frames have occurred so that both multiplications are complete, multiplexer 11 is switched to supply the contents of RESET CAPTURE circuit 15. This number represents the number of counts "lost" during the multiplication process and is clocked into COUNT HOLD register 10 as the previous count is clocked out for the last time. Thus, at the end of the multiplication process, the number in COUNT HOLD register 10 is the same as it would have been if the register had been counting word frames from the beginning of the input pulse period. MULTIPLEXER 11 then switches the input from adder 12 into COUNT HOLD register 10; and INC circuit 13 generates a one to be added to the least significant bit of the recirculating count during each word frame until the next INPUT pulse, after which the process is repeated.

Multiplication is accomplished by accumulating the sum of partial products in ACUM TERMS register 20. During each word frame of the first multiplication process, another bit, starting with the least significant, of the first proportionality factor is provided from GAIN circuit 17 to AND gate 16. During each of these word frames, the contents of COUNT HOLD register 10 are clocked to the other input of AND gate 16 and the output of AND gate 16 is added to the recirculated contents of ACUM TERMS register 20 being clocked through AND gate 21. However, the output of AND gate 21 is forced to zero by zeroing circuit 22 during the first word frame of the multiplication period and the last clock pulse of each word frame. During each word frame, the least significant bit of the accumulated partial product sum is dropped, so that a truncated product appears in ACUM TERMS register 20 at the end of the multiplication period. The accuracy of the product may be made as high as necessary, within practical limits, by the proper scaling of the numbers to the size of the registers and the frequencies involved. During the last word frame of the first multiplication period the accumulated sum of partial products is recirculated to COUNT HOLD register 10 for the second multiplication. In addition, during the first multiplication, the second proportionality constant or a constant representing proportional unity replaces the first proportionality constant in GAIN circuit 17. The second multiplication is accomplished in a similar manner, except that the second proportionality constant or the number representing proportional unity is read out for multiplication and, during the last word frame, as already described, the contents of RESET CAPTURE circuit 15 are read into COUNT HOLD register 10.

Figure 3:
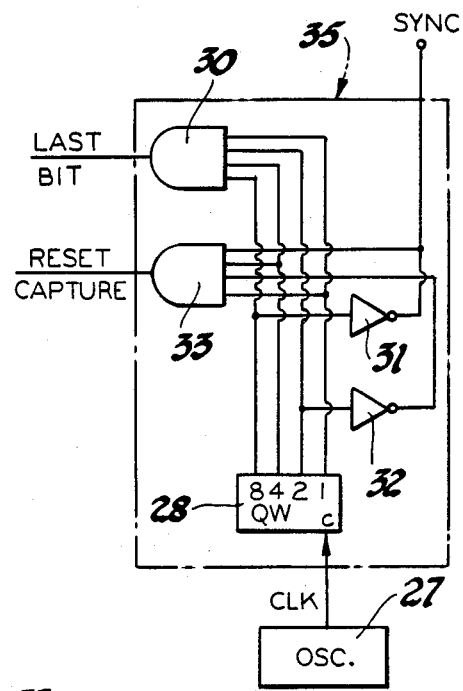
FIGS. 2-4 are schematic diagrams showing the different portions of the serial pulse frequency converter of FIG. 1 in greater detail.

Referring to FIG. 3, an oscillator 27 generates clock pulses CLK in a square wave at a frequency of, for example, 1 MHz. These pulses are provided to the clock (c) input of a binary four bit counter 28 having four parallel output lines QW8, QW4, QW2 and QW1. These output lines are connected to the four inputs of an AND gate 30 to generate a signal LAST BIT, which is high only during the last clock pulse of each word frame. An inverter 31 connected to the QW8 output line provides a signal SYNC, which is high during the first half, or eight clock pulses, of each word frame. SYNC is a synchronizing signal used in a number of places within the system to be described later in connection with FIGS. 2 and 4. The inverse of SYNC is shown in FIG. 5. Another inverter 32 is connected to the QW2 output and has an output provided to one of the four inputs of an AND gate 33. The other three inputs of AND gate 33 are provided with SYNC and the QW4 and QW1 outputs. The output of AND gate 33 generates RESET CAPTURE, which sequentially generates, during the sixteen clock cycles of each word frame, the binary equivalent of decimal 32, least significant bit first. RESET CAPTURE is the output of RESET CAPTURE circuit 15, which is used to initialize COUNT HOLD register 10 after multiplication is completed. The number 32 is the number of word frames required for two successive multiplications. The items described above in this paragraph together comprise a word frame reference circuit 35, as indicated in FIG. 3.

Figure 4:
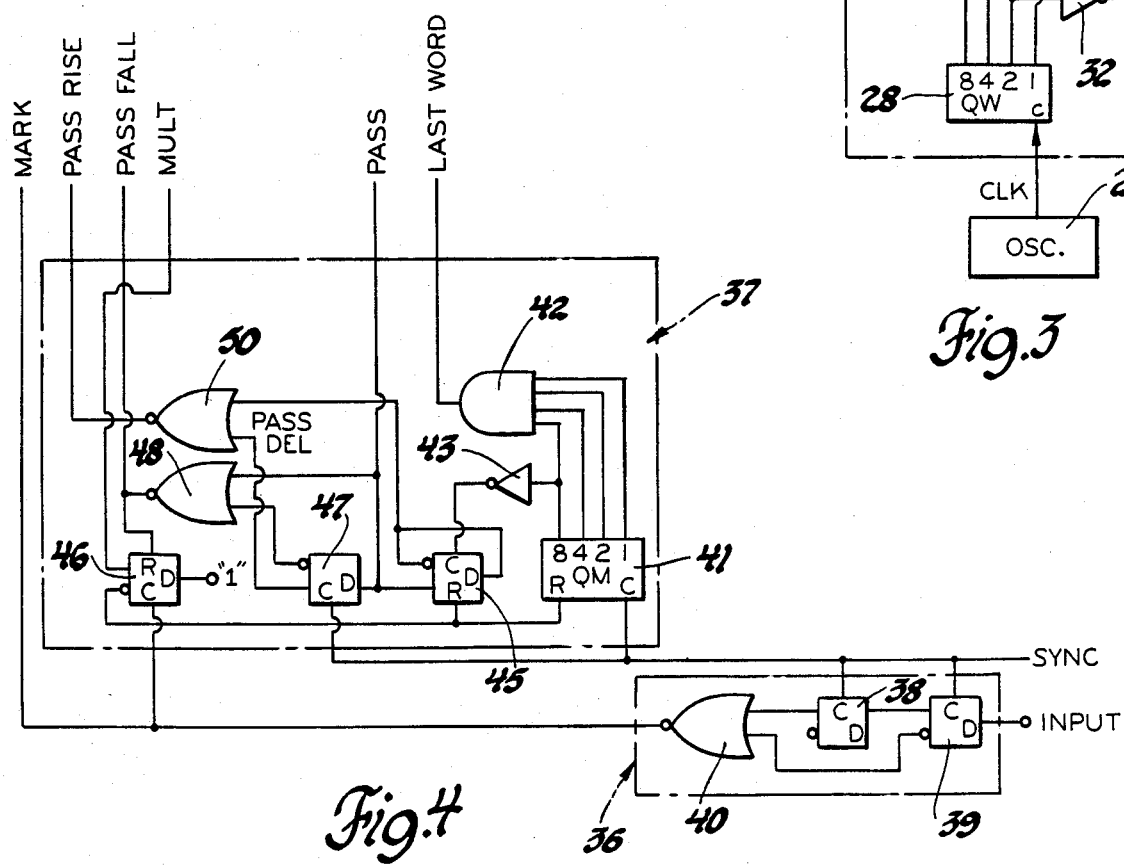
Figure 5:
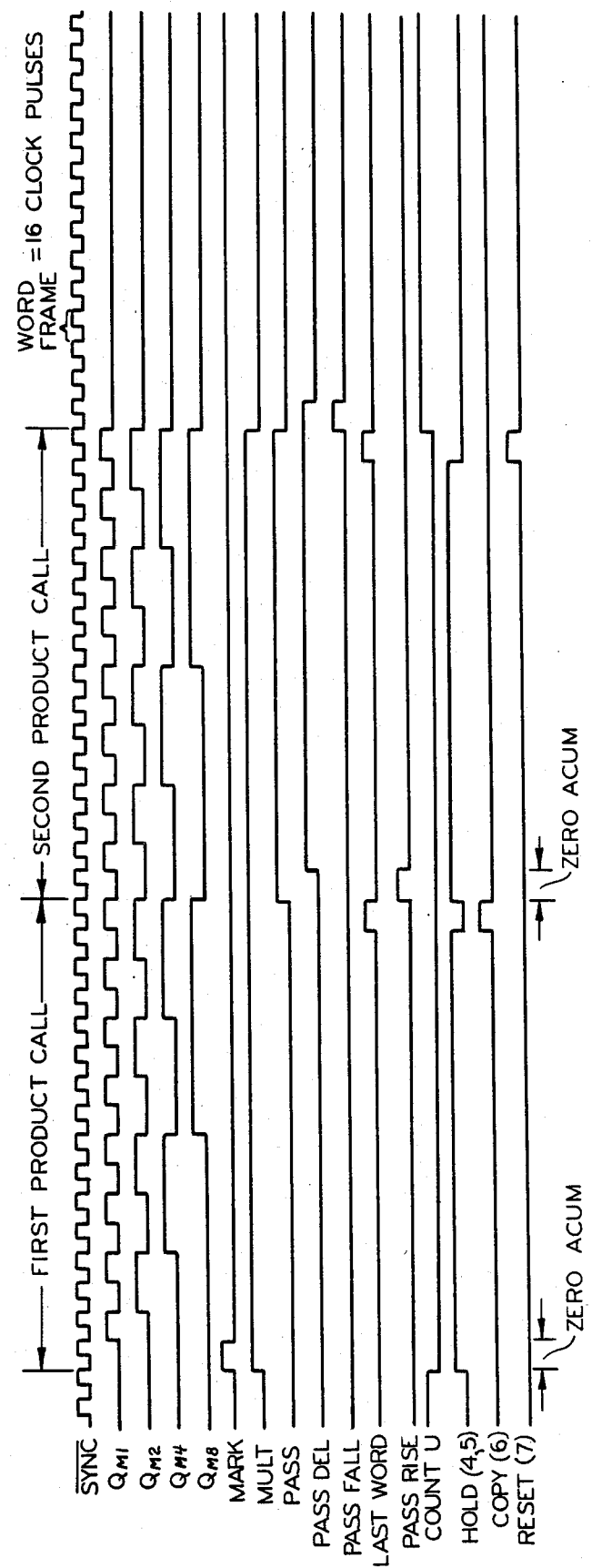
FIG. 5 shows selected waveforms appearing in the diagrams of FIGS. 2-4.

FIG. 4 shows two reference generating circuits: MARK generator circuit 36 and multiply reference circuit 37. MARK generator circuit 36 includes two flip-flops, 38 and 39, and a NOR gate 40. Flip-flop 39 receives the INPUT pulses on its D input and the SYNC signal on its clock input. Flip-flop 38 has a D input connected to the Q output of flip-flop 39 and a clock input connected to SYNC. NOR gate 40 has inputs connected to the NOT Q output of flip-flop 39 and the Q output of flip-flop 38 and an output which generates the signal MARK for one word frame after the receipt of each INPUT pulse. MARK, which is shown in FIG. 5, is the signal which marks the division between counting periods and initiates multiplication.

As seen in FIG. 4, multiply reference circuit 37 includes a binary 4 bit counter 41 having a serial clock input receiving SYNC, a reset input and parallel output lines QM8, QM4, QM2 and QM1 provided to an AND gate 42 to generate LAST WORD, a signal which is high during the fifteenth and thirty first word frames after a MARK pulse. The waveforms for LAST WORD and the outputs of output lines QM8, QM4, QM2 and QM1 are shown in FIG. 5. Returning to FIG. 4, MARK is provided to the clock input of a flip-flop 46 which has a D input with a permanent high input and a reset input. The QM8 output of counter 41 is inverted by inverter 43; and the inverted signal is provided to the clock input of a flip-flop 45, which has a reset input connected to the NOT Q output of flip-flop 46 and a D input connected to its own NOT Q output. The Q output of flip-flop 46 provides a signal MULT which, as will be described and which may be seen in FIG. 5, goes high with the MARK pulse and stays high for an additional 31 word frames after the MARK pulse to define number of word frames for two successive multiplications. The Q output of flip-flop 45 is connected to the D input of a flip-flop 47, which has a clock input receiving SYNC. The Q output of flip-flop 45, which is signal PASS as seen in FIG. 5, and the NOT Q output of flip-flop 47 are connected to the inputs of a NOR gate 48, the output of which is connected to the reset input of flip-flop 46 and also provides a signal PASS FALL, which goes high for the thirty-second word frame after a MARK pulse as shown in in FIG. 5. The Q output of flip-flop 47, which is signal PASS DEL as seen in FIG. 5, and the NOT Q output of flip-flop 45 are connected to the inputs of a NOR gate 50, which generates a signal PASS RISE, which goes high for the sixteenth word frame after a MARK pulse, as shown in FIG. 5.

Upon the initiation of a MARK pulse on the output of NOR gate 40, flip-flop 46 is set. This releases counter 41 from its reset condition and allows it to count word frames. Thus LAST WORD is synchronized as the fifteenth word frame after MARK, as shown in FIG. 5. Flip-flop 45 is still in a reset condition from the time prior to the MARK pulse; and flip-flop 47 is in a reset condition due to its low D input and the SYNC pulses on its clock input. The output of inverter 43 remains high. NOR gates 48 and 50 are each provided with one high and one low input; and both outputs are thus low. When the count of counter 41 reaches 8, the QM8 output goes high and inverter 43 goes low, but no other changes occur. When counter 41 reaches 15, LAST WORD goes high for one word frame as AND gate 42 sees all high inputs.

When counter 41 clocks from 15 to 0 and all its outputs go low, inverter 43 goes high and triggers a clocking of flip-flop 45 to its set state. This causes NOR gate 50 to go high with two low inputs and send PASS RISE high. NOR gate 48 now has two high inputs, but its low output does not change. The SYNC pulse which clocks counter 41 to a count of 1 also sets flip-flop 47, since its D input is now high. This causes NOR gate 50, and thus PASS RISE, to go low again, since both NOR gates 48 and 50 now have one high and one low input (although the high and low inputs are reversed from those produced by the MARK pulse). When counter 41 reaches 8 the output of inverter 43 goes low again; and when it reaches 15, LAST WORD again goes high for one word frame.

When counter 41 clocks from 15 to 0 the second time after a MARK pulse, flip-flop 45 is clocked to its reset state. Since flip-flop 47 is still set, NOR gate 48 now sees two low inputs and changes its output high. Signal PASS FALL thus goes high; and flip-flop 46 is reset to send signal MULT low. The reset of flip-flop 46 further holds flip-flop 45 and counter 41 to their reset conditions until the next MARK pulse. The next SYNC pulse clocks flip-flop 47 to its reset condition, since it has a low D input. This sends PASS FALL, the output of NOR gate 48, low and leaves multiply reference circuit 37 in the state previously described at the beginning of this description awaiting the next MARK pulse.

Figure 2:
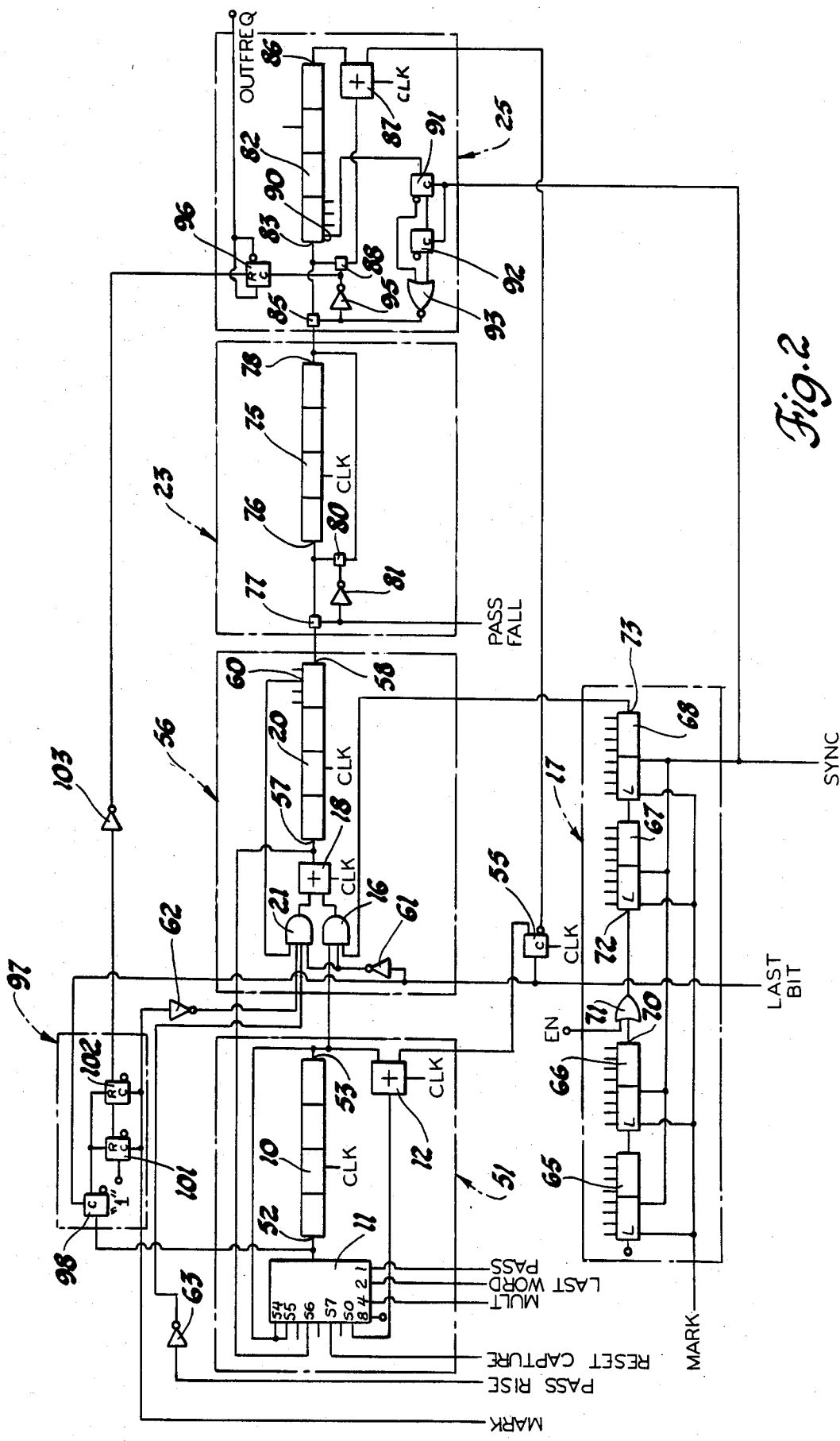

Now that the control signals of the system have been described, the multiplication, counting and output pulse generating circuitry may be described with reference to FIG. 2. Input capture block 51 comprises MULTIPLEXER 11, COUNT HOLD register 10 and adder 12. COUNT HOLD register 10 is a sixteen bit serial shift register having a serial input 52 to the most significant bit and an output 53 from the least significant bit. Output 53 is connected to one input of adder 12. Adder 12 is a serial adder with carry, preferably a half adder for circuit economy, which receives as a clock signal the clock pulses from oscillator 27. The other input of adder 12 is connected to the Q output of a flip-flop 55, which has a D input receiving signal LAST BIT and a clock input receiving the clock pulses CLK.

MULTIPLEXER 11 is an 8 to 1 analog multiplexer such as an RCA CD4051B or its equivalent. In this embodiment, five input lines (S4, S5, S6, S7, S0) and three control lines (1, 2, 4) are used. Control line 4 is provided with signal MULT; control line 2, with signal LAST WORD; and control line 1, with signal PASS. Input lines S4 and S5 are connected to output 53 of COUNT HOLD register 10; input line S7 is provided with signal RESET CAPTURE; and input line S0 is connected to the output of adder 12. The connection of input line S6 will be described at a later point.

Product accumulate block 56 comprises ACUM TERMS register 20, a sixteen bit serial shift register having a serial input 57 to the most significant bit, an output 58 from the least significant bit and an output 60 from the second least significant bit. Input 57 is connected to the output of adder 18, a serial adder with carry which has inputs connected to the outputs of AND gates 16 and 21. AND gate 16 has a first input connected to output 53 of COUNT HOLD register 10, a second input which is provided, through an inverter 61, the inverse of signal LAST BIT, and a third input connected to the output of GAIN circuit 17 in a manner to be described. AND gate 21 has first and second inputs provided, through inverters 62 and 63, respectively, with the inverse of signals MARK and PASS RISE. AND gate 21 further has third and fourth inputs connected, respectively, to the output of inverter 61 and output 60 of ACUM TERMS register 20. The output of adder 18 is further provided to input S6 of MULTIPLEXER 11.

GAIN circuit 17 comprises four eight bit serial shift registers 65, 66, 67, 68 connected as two sixteen bit serial registers 65, 66 and 67, 68. Serial registers 65–68 have parallel inputs to each bit position from memory means, not shown, in which proportionality constants are stored. A load signal input in each register is provided with signal MARK to provide loading of the proportionality constants into the serial registers. Signal SYNC is provided as a clock signal to the registers. The sixteen bit register comprising registers 65, 66 has a serial output 70 from the least significant bit through an enabling OR gate 71 to an input 72 at the most significant bit of the sixteen bit serial register comprising registers 67, 68. The latter sixteen bit serial register has an output 73 from the least significant bit connected to the third input of AND gate 16. OR gate 71 has another input provided with an enabling signal EN. The use of two sixteen bit serial registers and enabling OR gate 71 allows a second proportionality constant with an externally controlled choice between the use of only the first and the first modified by the second. A first mode of operation provides a constant high input to the other input of OR gate 71 so that, as the first proportionality constant is clocked out of register 67, 68, all ones are clocked into the same register from OR gate 71. With all bits of register 67, 68 filled with ones, a binary number representing a proportionality constant of essentially unity is clocked out of the register during the second sixteen word frames for the second multiplication. The other mode of operation provides a low signal on the other input of OR gate 71 so that the second proportionality constant is passed through from register 65, 66 to register 67, 68 during the first sixteen word frames for multiplication by the second proportionality constant during the second sixteen word frames. The use of a first proportionality constant and selectable second proportionality constant makes the converter adaptable to vehicles having transfer cases and other devices in the driveline which may change the final drive ratio in such a manner that the transducer is not aware of the change. The control which makes the change in final drive ratio is also adapted to provide a signal to the converter to select or deselect the second proportionality constant as necessary to maintain an accurate vehicle speed indication to the speedometer circuits. Registers 65–68 would preferably be replaced in a VLSI embodiment of this circuit by a ROM arrangement with appropriate address decoding in response to multiply reference circuit 37.

The operation of the counting and multiplication portions of the system will now be described. During most of the period between two consecutive INPUT pulses, the system is counting word frames and storing the count in COUNT HOLD register 10. This is accomplished as follows. MULTIPLEXER 11 receives low signals on all control lines to activate input line S0. The contents of COUNT HOLD register 10 are thus recirculated through adder 12. During the last clock pulse CLK of each word frame, signal LAST BIT goes high. Flip-flop 55 delays this high signal for one clock pulse and provides it to the other input of adder 12, where its arrival is timed to coincide with the least significant bit of COUNT HOLD register 10. Since the count of COUNT HOLD register 10 is recirculated once each word frame, it is thus incremented by one during each word frame. Thus, signal LAST BIT, delayed by flip-flop 55, performs the function of INC circuit 13 of FIG. 1.

Assuming that an accurate count has been incrementing in COUNT HOLD register 10 since the last INPUT pulse, the arrival of the next INPUT pulse stops the count and begins the multiplication process in the following manner. The INPUT pulse creates a MARK signal as already described. It simultaneously causes signal MULT to go high and causes MULTIPLEXER 11 to switch to input S4. As a result, the output of COUNT HOLD register 10 is recirculated unaltered; and the count is thus held. The contents of COUNT HOLD register 10 are simultaneously provided to AND gate 16. The MARK pulse caused the loading of the proportionality constants in registers 65–68; and the SYNC signal clocked the least significant bit of register 68 to enable or disable AND gate 16, depending on its value. During the first word frame of multiplication, the contents of COUNT HOLD register 10 are clocked through AND gate 16 to adder 18 if the least significant bit of the first proportionality constant is a 1, with the exception of the sixteenth or most significant bit, which is blanked by inverter 61 and signal LAST BIT. A string of sixteen zeros reaches adder 18 if the least significant bit of the first proportionality constant is a zero. It will be seen, if the process is followed through for some sample numbers, that the repeated addition in adder 18 of the contents of ACUM TERMS register 20, with the least significant bit dropped and the remainder shifted one bit to the right, and the product of the contents of COUNT HOLD register 10 and each successive more significant bit of the proportionality constant will provide the correct truncated sum of partial products and thus eventually the correct product if the inputs to adder 18 are both zeroed for the most significant bit of each partial product. During the first word frame, inverter 62 and signal MARK cause AND gate 21 to be disabled, so that the recirculated output to adder 18 from the second least significant bit of ACUM TERMS register 20 is zero. This effectively initializes the product accumulator to allow accurate accumulation of the first partial product of the multiplication.

During each of the next fifteen word frames, MARK is low and a new, more significant bit of the first proportionality factor is used to pass or not pass the count of COUNT HOLD register 10 to adder 18, wherein it is added to the contents of ACUM TERMS register 20 which have been shifted by one bit due to the fact that the recirculation of the output of ACUM TERMS register 20 is taken from the second least significant bit. Thus each successive word frame causes another partial product to be accumulated and the least significant bit of the accumulated sum to be dropped. The final result is the accumulation of the most significant bits of the product in ACUM TERMS register 20. However, it should also be noted that, during the sixteenth or last recirculation, during which the final sum is being created, one bit at a time, in adder 18 and passed to ACUM TERMS register 20, signal LAST WORD goes high and switches MULTIPLEXER 11 to provide the output of adder 18 to input 52 of COUNT HOLD register 10. Thus COUNT HOLD register 10 receives the final sum. The sum is simultaneously received by ACUM TERMS register 20; however, this fact is incidental, since that copy of the sum will be discarded.

During the second sixteen word frames of multiplication, the process described above is generally repeated, with the following exceptions or changes. First, the starting number in COUNT HOLD register 10 is now the product of the count and the first proportionality constant rather than the count itself. Second, the contents of registers 65–68 have been shifted by sixteen bits, so that the contents of registers 67, 68 are now either the second proportionality constant, if signal EN was low during the first sixteen word frames, or all ones, if signal EN was high during the first sixteen word frames. The latter case of all ones results in a second proportionality factor of effective unity. Third, for the first fifteen word frames, MULTIPLEXER 11 is provided with a high PASS signal as well as a high MULT signal to activate input line S5; but this provides the same recirculation of COUNT HOLD register 10 as input S4 during the first multiplication. Fourth, signal PASS RISE, through inverter 63, provides blocking of recirculation of the contents of register ACUM TERMS 20 during the first word frame of the second multiplication. Thus, the inverted signals MARK, PASS RISE and LAST BIT provide the function of ZERO circuit 22 of FIG. 1, with all signals provided to AND gate 21 and only the last provided to AND gate 16. Fifth, during the sixteenth and final word frame of the second multiplication, MULTIPLEXER 11 receives an additional high LAST WORD input, which activates input line S7 to read signal RESET CAPTURE into COUNT HOLD register 10 from the most significant bit as the first product is read out of the register from the least significant bit. As previously mentioned, RESET CAPTURE is a series of bits representing the number thirty-two, which represents the number of counts "lost" during the multiplication process. With this number loaded into COUNT HOLD register 10, the switching of MULTIPLEXER 11 to input S0 on the next word frame as all three control lines go low initiates another counting period with a count as if it had not been used in the multiplication.

With the accumulation of the final partial product of the second multiplication in ACUM TERMS register 20, the multiplication process is complete. It only remains to transfer this number to PRESET BUFFER 23 and OUTPUT TIMER 25. But first these devices must be described in detail.

PRESET BUFFER 23 comprises preset hold register 75, a sixteen bit serial shift register having a serial input 76 connected through a transmission gate 77 to output 58 of ACUM TERMS register 20. Gate 77 is controlled by signal PASS FALL. Preset hold register 75 further includes an output 78 connected back through a transmission gate 80 to input 76. Gate 80 is controlled by signal PASS FALL through an inverter 81 so that, at all times only one of gates 77 and 80 is activated. In operation, signal PASS FALL is high for one word frame after the fall of signal MULT at the end of the second multiplication. During this word frame, the final product from ACUM TERMS register 20 is read into preset hold register 75. At all other times the contents of preset hold register 75 is recirculated unchanged.

OUTPUT TIMER 25 comprises time left register 82, a sixteen bit serial shift register having a serial input 83 connected back to output 78 of preset hold register 75 through a transmission gate 85. Register 82 further has an output 86 connected to one input of an adder 87 having another input from the NOT Q output of flip-flop 55. The output of adder 87 is connected through a transmission gate 88 to input 83 of time left register 82. Time left register 82 has an output 90 from its most significant bit which is connected to the D input of a flip-flop 91 having a Q output connected to the D input of a flip-flop 92 and a NOT Q output connected to one input of a NOR gate 93. Flip-flop 92 has a Q output connected to the other input of NOR gate 93. Flip-flops 91 and 92 have clock inputs provided with signal SYNC. The output of NOR gate 93 controls gate 85 and, through an inverter 95, gate 88.

In the operation of OUTPUT TIMER 25, the contents of preset hold register 75 are read into time left register 82 when gate 85 is activated. The number in time left register 82 is then counted down at the rate of one count per word frame as its contents are recirculated through adder 87 and gate 88. The number as originally read in always has a zero in the most significant bit. This has two important consequences. The first is that a one in the most significant bit is an overflow signal which indicates that zero has been reached in the countdown. Thus output 90 triggers flip-flops 91, 92 and NOR gate 93 to activate gate 85 for one word frame to accomplish the next loading. The other consequence is that the addition in adder 87 each word frame of a binary number comprising all ones except for a zero in its least significant bit results in a decrement of the number in time left register 82. This is not the case when a one appears in the most significant bit of time left register 82. The number to be added is obtained from flip-flop 55 as the inverse of LAST BIT delayed by one clock pulse CLK.

OUTPUT TIMER 25 further comprises a flip-flop 96 having a clock input connected to the output of inverter 95, and a D input connected to its NOT Q output. The NOT Q output of flip-flop 96 provides the SYSTEM output OUTFREQ. Flip-flop 96 converts the variable, non-symmetrical duty cycle of the signal on the output of inverter 95 to a 50% square wave output and also divides the output frequency in half.

One additional portion of the circuit not yet described is a low speed detect circuit 97. It comprises a flip-flop 98 having a D input connected to the output of MULTIPLEXER 11 and a Q output connected to the reset inputs of flip-flops 101 and 102. The Q output of flip-flop 101 is connected to the D input of flip-flop 102; and the Q output of flip-flop 102 is connected through an inverter 103 to the reset input of flip-flop 96. Flip-flop 101 has a D input provided with a constant high input signal. Flip-flop 98 is clocked by signal LAST BIT, while flip-flops 101 and 102 are clocked by signal MARK.

In operation, signal MARK clocks flip-flops 101 and 102 with each new INPUT pulse. LAST BIT clocks flip-flop 98 on the last bit of each word frame. The output of MULTIPLEXER 11 at this time is the number going into the most significant bit of COUNT HOLD register 10 as the word frame is completed. If it is a one (1), the count between the last two INPUT pulses is too large, due to low INPUT frequency. Flip-flop 98 thus switches to a high output and resets flip-flops 101 and 102. The resulting low Q output of flip-flop 102 is inverted by inverter 103 and causes a reset of flip-flop 96 to stop the output of the system. When the next INPUT pulse occurs, if the INPUT frequency has increased sufficiently that flip-flop 98 is once again set, flip-flop 101 will be set by the MARK signal, but flip-flop 102 requires a second consecutive INPUT pulse at the sufficiently high frequency in order to set and once again enable flip-flop 96 to allow an output signal. Thus, not only does the low frequency detect signal prevent an output signal below a predetermined input signal to limit the low frequency of the input to the following electronic speedometer or other circuitry, but it also prevents an invalid output from the converter circuitry due to a one (1) in the most significant bit of COUNT HOLD register 10, which would adversely affect the accuracy of operation of both the accumulation of the sum of partial products in ACUM TERMS register 20 and the downcounting of TIME LEFT register 82. The two consecutive good count requirement for reenabling the output signal OUTFREQ provides time for such internal invalid date as may be created to be cleared out of the converter.

It can be seen that the frequency of INPUT pulses is changed by this apparatus to a different output frequency in the signal OUTFREQ. The range of available conversion ratios is determined by several factors such as the size of the serial registers and the minimum and maximum speeds desired. As an example, assume 16 bit serial registers, a CLK frequency of 1 MHz and a 1 Hz/1 MPH ratio, so that the low speed detect actuates (with a 1 in the most significant bit of the register) at 2 MPH. Since 2 MPH corresponds to $2^{15}$ or 32,768 counts, 64 MPH corresponds to 1,024 counts. If it is desired to have a minimum of 100 in the output counter at 64 MPH, the dynamic range of the allowed conversion ratios is approximately 10:1. At speeds greater than 64 MPH, there will be fewer than 100 counts in the output register, but there will still be 50 counts at 128 MPH and at these speeds a very slight decrease in accuracy is not considered critical. Since there is effectively a divide by two performed in the output by flip-flop 96, the range of conversion ratios will be from 0.5 to 5, with very fine resolution in specific ratios between these limits.

The embodiments of the invention in which an exclusive property or privilege is claimed are defined as follows:

1. A serial pulse frequency converter of the type including input means for counting word pulses of a higher frequency between consecutive input pulses and multiplying the count consecutively by two proportionality constants and output means for storing the resulting second product, repeatedly downcounting the stored resulting second product at the higher frequency and generating an output pulse for each completed downcount, in which the input means comprises, in combination:

clock means generating clock pulses, each N consecutive clock pulses defining a word frame;

first and second serial registers clocked by the clock pulses, each of the serial registers holding N bits and having serial inputs to the most significant bit and serial outputs from the least significant bit;

first and second enabling gate means;

a gain circuit triggerable to serially output first and second N bit proportionality constants at the rate of one bit each word frame to enable or disable the first enabling gate means for the duration of the word frame;

a first adder having an input connected to the output of the first serial register through the first enabling gate means and an output connected to the input of the second serial register, the first adder having another input connected through the second enabling gate means to the second least significant bit of the second serial register;

zero circuit means effective to disable the first and second enabling gates for the last clock pulse of each word frame and to disable the second enabling gate for the first and N+1th word frame after the reception of an input pulse;

constant generating means having a serial output and being effective to serially generate the number 2N during each word frame;

a second adder receiving the first clock pulse of each word frame as the word pulse on one input thereof and having another input connected to the output of the first serial register; and multiplexer means effective (a) to connect the input of the first serial register to the output thereof during word frames number 1 to N−1 and word frames number N+1 to 2N−1 following the reception of an input pulse for recirculation of the contents to allow serial first and second multiplications by successive bits of the first and second proportionality constants in the first enabling means and accumulation of the sums of partial products of the first and second multiplications in the second serial register, (b) during the Nth word frame after the reception of an input pulse to connect the output of the first adder to the input of the first serial register for replacement of the contents of the latter by the product of the first multiplication during the creation of the last partial product of the first multiplication, (c) during the 2Nth word frame after the reception of an input pulse to connect the output of the constant generating means to the input of the first serial register for replacement of the contents of the latter by the number of word frames used in the serial first and second multiplications during the creation of the last partial product of the second multiplication and (d) for each word frame after number 2N until the next input pulse to connect the input of the first serial register to the output of the second adder, whereby the count in the first serial register is incremented by one during each word frame and maintains an accurate total count of word frames between consecutive input pulses.

2. The serial pulse frequency converter of claim 1 in which the input means further includes low frequency detection means comprising sampling means responsive to the output of the multiplexer means during the last clock pulse of each word frame as an indication of the most significant bit of the contents of the first serial register during the next clock pulse and control means responsive to the sampling means to generate a signal indicating low frequency if the sampling means indicates a one in the most significant bit, the control means, once generating the signal, requiring an indicated zero in the most significant bit for two consecutive input pulses to disable the signal, the output means of the serial pulse frequency converter including disabling means activated by the signal to suppress the output pulses thereof.

3. The serial pulse frequency converter of claim 1 in which the gain circuit includes serial register and gate means which, during the first multiplication after the receipt of an input pulse, simultaneously serially outputs the first proportionality constant while it inputs, selectively, either the second proportionality constant or a number representing a proportionality constant of unity for output during the second multiplication, whereby the effect of the second proportionality constant is optional.

4. A serial pulse frequency converter of the type including input means for counting word pulses of a higher frequency between consecutive input pulses and multiplying the count consecutively by two proportionality constants and output means for storing the resulting second product, repeatedly downcounting the stored resulting second product at the higher frequency and generating an output pulse for each completed downcount, in which the input means comprises, in combination:

clock means generating clock pulses, each N clock pulses defining a word frame;

first and second serial registers clocked by the clock pulses, each of the serial registers holding N bits and having serial inputs to the most significant bit and serial outputs from the least significant bit;

a first adder having an output connected to the input of the second serial register;

a first AND gate having an input from the output of the first serial register and an output to one input of the first adder;

a second AND gate having an output to the other input of the first adder and an input from the second least significant bit of the second serial register;

a multiplexer having an output to the input of the first serial register and a plurality of inputs, the first input connected to the output of the first serial register;

a second adder having an output connected to a second input of the multiplexer and one input connected to the output of the first serial register;

a third serial register effective to hold two N bit proportionality constants and having an output from its least significant bit connected to another input of the first AND gate;

means responsive to each input pulse to generate a MARK pulse coincident with the next word frame, a PASS RISE pulse coincident with the Nth word frame after the MARK pulse and LAST WORD pulses coincident with the N−1th and 2N−1th word frames after the input pulse, each of the MARK, PASS RISE and LAST WORD pulses having a duration of N clock pulses;

means effective to generate a LAST BIT pulse during the last clock pulse of each word frame;

delay means effective to apply the LAST BIT pulses as the word pulses to the other input of the second adder with a one clock pulse delay to increment the count of the first serial register once each complete recirculation of the first serial register when the second multiplexer input is activated;

means effective to apply the LAST BIT pulses to other inputs of the first and second AND gates to disable these gates during the last clock pulse of each word frame;

means effective to apply the MARK and PASS RISE pulses to the second AND gate to disable this gate during these pulses and thus zero the second serial register at the start of each of the first and second multiplications;

constant generating means having a serial output connected to a third input of the multiplexer and being effective to serially generate the number 2N during each word frame;

circuit means connecting the output of the first adder to a fourth input of the multiplexer;

a multiplexer control circuit effective (a) upon the generation of a MARK pulse to initiate circulation of the first and second proportionality constants through the third serial register, (b) upon the generation of a MARK pulse and upon the Nth word frame after the MARK pulse to activate the first multiplexer input, whereby the contents of the first serial register are recirculated and repeatedly provided to the first AND gate for first and second serial multiplications by successive bits of the first and second proportionality constants, respectively, with accumulation of the sum of the partial products in the second serial register, (c) during the first LAST WORD pulse after each MARK pulse to activate the fourth multiplexer input and thus cause circulation of the contents of the second serial register into the first register to initialize it for the second multiplication, (d) during the second LAST WORD pulse after each MARK pulse to activate the third multiplexer input and thus initialize the first serial register, as the last partial product is being accumulated in the second serial register, with the number of counts corresponding to the duration of the first and second multiplications and (e) after the second LAST WORD pulse to activate the second multiplexer input, whereby the count of the first serial register is incremented until the next input pulse and maintains an accurate total count of word frames between consecutive input pulses.

5. The serial pulse frequency converter of claim 4 in which the input means further includes low frequency detection means comprising a first flip-flop responsive to the output of the multiplexer means during each LAST BIT pulse to assume an output state indicating the state of the most significant bit of the first serial register during the next clock pulse and second and third flip-flops clocked by each MARK pulse to reset if the output of the first flip-flop indicates a one in the most significant bit of the first serial register, the second flip-flop being effective to set by the first MARK pulse occurring when the first flip-flop is in its opposite state but the third flip-flop being controlled by the output of the second to require two consecutive such MARK pulses in order to set, a reset condition of the third flip-flop defining a signal indicating low frequency, the output means of the serial pulse frequency converter including disabling means activated by the signal to suppress the output pulses thereof.

6. The serial pulse frequency converter of claim 4 in which the gain circuit comprises third and fourth serial registers clocked once each word frame, the third and fourth serial registers being effective upon the receipt of an input pulse to hold the first and second N bit proportionality constants, respectively, the third serial register being adapted to serially output the first proportionality constant to enable and disable the first enabling gate means during the first multiplication after the receipt of an input pulse, the fourth serial register being adapted to simultaneously serially output the second proportionality constant, the gain circuit further comprising means effective to selectively provide the output second proportionality constant or a number representing a proportionality constant of unity to the third serial register during the first multiplication after the receipt of an input pulse to replace the first proportionality constant for the second multiplication, whereby the effect of the second proportionality constant is optional.

* * * * *